US005110519A

United States Patent [19]

Daubenbüchel et al.

[11] Patent Number: 5,110,519

[45] Date of Patent: May 5, 1992

[54] PROCESS FOR MINIMIZING DISTURBANCE OF MULTI-LAYER LAMINATE MATERIAL IN EXTRUSION OF MULTI-LAYER PREFORMS FOR BLOW MOLDING OF HOLLOW BODIES

[75] Inventors: Werner Daubenbüchel, Bergisch-Gladbach; Otto Eiselen, Königswinter; Karsten Friedrichs, Bad Honnef; Dieter Hess, Swisttal; Erich Kiefer; Peter Klüsener, both of Bonn, all of Fed. Rep. of Germany

[73] Assignee: Krupp Kautex Maschinenbau GmbH, Bonn, Fed. Rep. of Germany

[21] Appl. No.: 549,794

[22] Filed: Jul. 9, 1990

[30] Foreign Application Priority Data

Jul. 12, 1989 [DE] Fed. Rep. of Germany ....... 3922883

[51] Int. Cl.[5] ........................ B29C 49/04; B29C 49/78

[52] U.S. Cl. ................................ 264/40.2; 264/40.5; 264/40.7; 264/515; 264/541; 425/133.1; 425/140; 425/145; 425/149; 425/523; 425/150; 425/155

[58] Field of Search .................... 264/40.2, 40.4, 40.5, 264/40.7, 515, 541; 425/132, 133.1, 140, 145, 147, 149, 150, 523, 532, 381, 466, 465, 155

[56] References Cited

U.S. PATENT DOCUMENTS

| | | | |
|---|---|---|---|
| 3,375,552 | 4/1968 | Beck | 18/30 |
| 3,386,132 | 6/1968 | Fischer | 425/140 |
| 3,611,494 | 10/1971 | Feuerherm | 18/14 R |
| 3,759,648 | 9/1973 | Hunkar . | |
| 3,795,719 | 3/1974 | Morecroft et al. | 264/40.5 |
| 4,149,839 | 4/1979 | Iwawaki et al. | 425/133.1 |
| 4,159,293 | 6/1979 | Fukase et al. | 264/40.5 |
| 4,338,071 | 7/1982 | Daubenbüchel et al. | 264/40.7 |
| 4,382,761 | 5/1983 | Daubenbuchel et al. | 425/140 |
| 4,382,766 | 5/1983 | Feverherm | 425/381 |
| 4,444,702 | 4/1984 | Thomas et al. | 264/40.7 |
| 4,474,716 | 10/1984 | Daubenbuchel et al. | 264/40.4 |
| 4,548,569 | 10/1985 | Pitigliano et al. | 425/133.1 |
| 4,717,326 | 1/1988 | Motonaga et al. | 425/133.1 |
| 4,758,144 | 7/1988 | Becker | 425/133.1 |
| 4,867,664 | 9/1989 | Fukuhara | 425/132 |
| 4,937,035 | 6/1990 | Richter | 264/515 |
| 4,959,001 | 9/1990 | Langlois et al. | 264/40.7 |
| 4,971,542 | 11/1990 | Langlois et al. | 264/40.7 |
| 4,978,290 | 12/1990 | Fukuhara | 425/147 |

FOREIGN PATENT DOCUMENTS

| | | | |
|---|---|---|---|
| 0026828 | 8/1980 | European Pat. Off. . | |
| 0158814 | 3/1985 | European Pat. Off. . | |
| 0249866 | 6/1987 | European Pat. Off. . | |
| 1813421 | 7/1970 | Fed. Rep. of Germany . | |
| 1293637 | 4/1962 | France . | |
| 2299957 | 9/1976 | France . | |
| 56-033928 | 4/1981 | Japan | 425/523 |
| 63-260418 | 10/1988 | Japan . | |
| WO8802689 | 4/1988 | PCT Int'l Appl. . | |
| 974596 | 11/1964 | United Kingdom | 264/541 |

*Primary Examiner*—Jan H. Silbaugh
*Assistant Examiner*—Catherine Timm
*Attorney, Agent, or Firm*—Panitch Schwarze Jacobs & Nadel

[57] ABSTRACT

In a process and apparatus for the production of hollow bodies from thermoplastic material, the walls of the hollow bodies are of a laminate structure having at least first and second layers, by means of extrusion blow molding, the pressure within the extrusion head and more particularly at the location at which the laminate is formed by the discharge of flows of material from a storage chamber in the head is maintained within limits such as to avoid disturbing the laminate to such an extent as to have an adverse effect on its function. The pressure at the time of a transition between filling and emptying of the storage chamber and between emptying and filling of the storage chamber is maintained substantially at a pressure level which approximately corresponds to the storage chamber emptying pressure.

20 Claims, 5 Drawing Sheets

E = EMPTYING PHASE F = FILLING PHASE

PROCESS FOR MINIMIZING DISTURBANCE OF MULTI-LAYER LAMINATE MATERIAL IN EXTRUSION OF MULTI-LAYER PREFORMS FOR BLOW MOLDING OF HOLLOW BODIES

BACKGROUND OF THE INVENTION

The present invention relates to a process and an apparatus for the production of hollow bodies from thermoplastic material, the wall of which comprises a laminate formed by at least first and second layers, by means of extrusion blow molding.

In a process for the production of a hollow body from thermoplastic material with a wall in the form of a laminate structure comprising at least first and second layers, preforms are first produced in a batch-wise manner, the wall of each preform having a suitable number of layers, by using an extrusion unit comprising at least first and second continuously operating extruders with a common extrusion head. The extrusion unit is provided with at least one storage chamber for storage of materials which are plasticised in the extruders, together with at least one means which is movable with a reciprocating stroke-type movement between first and second limit positions by suitable drive means, for ejecting the materials from the storage chamber to empty same, thereby to form preforms. Flows of material from the at least one storage chamber, the number thereof corresponding to the number of layers for forming the wall of the hollow body, are brought together in the region of the extrusion head in such a way that mutually adjoining flows of material are joined together in at least one laminate-formation area to provide a laminate for constituting the wall of the preform. The laminate is advanced through a communicating duct within the extrusion head to an outlet opening disposed at a spacing from the storage chamber. A given portion by volume of the laminate is the ejected through the outlet opening to form the preform which has two end portions and a central portion. At least a part of the central portion is expanded within the mold cavity of a split blow molding mold under an increased internal pressure therein, while the end portions of the overall portion of material forming the respective preform are squeezed off the preform as constituting excess material, by means of a squeezing-off operation in which parts of the blowing mold participate, the excess material remaining outside the mold cavity.

It will be noted at this point that the means for emptying the storage chamber is generally in the form of an annular piston and for that reason, for the sake of simplicity, reference will be mainly made hereinafter to an annular piston, without however that term being intended to constitute a limitation in regard to the design configuration of the chamber-emptying means.

In an operating procedure along the lines of the process set forth above, as disclosed in German laid-open application (DE-OS) No. 36 35 334, the individual flows of material are firstly put into an annular configuration in cross-section, within the annular piston of the extrusion head, and the flows of material are then brought together within the annular piston to form the laminate. That laminate is passed through an annular duct into the storage chamber so that the plastic materials for making the preform are already stored in laminate form. Thus, in the subsequent emptying stroke movement for emptying the material from the storage chamber, which is performed by the annular piston, the laminate which has already been formed in the storage chamber is displaced towards the outlet opening thereof.

In another operating procedure as set forth in German laid-open application (DE-OS) No. 36 20 144, use is made of an extrusion head in which the flows of material from the extruders are passed through annular ducts disposed in a stationary component of the extrusion head, to a laminate-formation region from which the laminate produced from the flows of material is passed through an annular duct into the storage chamber which can then be emptied by the annular piston unit.

The fact that the preform is produced in a batch-wise manner in dependence on the stroke movements of the annular piston for emptying the material from the storage chamber in the above-discussed constructions, means that a distinction can be made between two operating phases, during a working cycle, within the extrusion head. After conclusion of the production of a preform by ejection of a suitable amount of laminate structure through the outlet opening of the extrusion head, the storage chamber is emptied. In that case the annular piston assumes its limit position at the end of the chamber-emptying operation. In the subsequent operating phase, namely the filling phase, the storage chamber is filled with laminate, the layers of which are conveyed into the extrusion head by the associated extruders which thus perform a material plasticising operation. In that case the annular piston used for emptying the storage chamber is then moved back into its second limit position corresponding to the end of the chamber-filling operation. During that operating phase, no preform is ejected from the extrusion head so that the material in laminate form which is to be found in the duct system between the storage chamber and the outlet opening is also not moved. After the operation of filling the storage chamber with material has been concluded, the procedure then consists of the other operating phase, namely the ejection or emptying phase, in which the previously formed laminate, for producing a preform, is ejected from the storage chamber under the action of the annular piston and displaced towards the outlet opening. When that happens, the laminate flows through a communicating duct towards the outlet opening. During that second operating phase, the ejection operation which involves the formation of the preform is predominantly effected by virtue of displacement of the material out of the storage chamber by means of the annular piston. However also added thereto is a minor portion of material which, when the extruders or plasticising devices are operating continuously, is conveyed by same into the extrusion head during the ejection stroke movement of the piston, with the consequence that as a result a certain proportion of material is additionally urged towards the outlet opening, in addition to the material which is displaced by the annular piston. Uninterrupted operation of the extruders for plasticising the materials for the layers of the laminate structure is desirable so that the operating conditions thereof can be stabilised.

The batch-wise and therefore discontinuous production of the preforms results in different operating conditions, corresponding to the different operating phases, in particular in regard to the pressure conditions obtained in the extrusion head. During the phase in which the storage chamber is being emptied, the laminate must be moved through the generally narrow outlet opening and therefore a high resistance to flow thereof has to be overcome. Accordingly in that phase the annular piston subjects the plastic material to an elevated pressure in order to be able to eject the laminate within a predetermined period of time.

During the other operating phase when the storage chamber is being filled, the pressure obtained in the plastic material is usually low. As the outlet opening is generally not a closable opening, it is only possible in that way to provide that no laminate flows out of the outlet opening as the pressure is too low to overcome the resistance to flow thereof.

The above-indicated different pressure conditions which accordingly vary from one phase to another mean in relation to the known procedures that, during the transitions from filling to emptying and from emptying to filling, different pressures obtained in the laminate-formation region in the individual flows of material which make up the laminate structure, and those different pressures can result in irregularities in formation of the laminate structure. Those irregularities therefore occur in particular in the portion of the laminate which is formed in the laminate-formation region during the period of a transition between two operating phases, which can be extended to the final phase of the emptying procedure and the starting phase of the filling operation, or the final phase of the filling operation and the starting phase of the emptying operation. That is to be attributed for example to the fact that thermoplastic materials in a plastic condition do not behave like a liquid but within certain limits have a certain degree of resilient compressibility which, when the pressure is relieved, results in a return or restoration movement, that is to say an increase in volume while, when the pressure is increased, the resilient compressibility results in a compression effect and therefore a reduction in the volume of the plastic material, so that it is necessary to bear in mind that, during the transitions between the operating phases, in the region in which the laminate is being formed, the individual flows of material for making up the laminate structure experience deformation effects due to differences in compression and decompression in respect of the individual flows of material. Such deformation of the flows of material will result in the laminate being of an irregular structure, in particular in regard to spatial and quantitative distribution of the individual layers in the laminate structure. At any event a relief of pressure can result in decompression of the material and an increase in pressure can result in compression of the material; due to the different volumes involved in the individual layers and the generally different volumes of the individual duct systems through which the flows of material, while still separated, flow to the laminate-formation region where they are brought together to form the laminate structure, and in consideration of differences in the properties of the materials forming the individual flows of material, the compression and decompression effects may be different in the respective individual flows of material, with the result that irregularities in the distribution of the individual layers in the laminate structure may occur in the region of the laminate-formation area, in the individual flows of material going to that area. Those irregularities do not occur at least to that extent when the preforms are being extruded continuously as that procedure does not involve variations in the pressure conditions, as are caused by batch-wise formation of the preforms.

The above-described irregularities can result in serious reductions in the level of quality of the hollow bodies to be made from the preforms, by virtue of the fact that the walls thereof are of an irregular nature. In that connection the nature and extent of the irregularity can be neither controlled nor foreseen. In that respect the way specifically in which the flows of material are guided in the extrusion head prior to the laminate formation operation is immaterial as the variations in the pressure conditions, which give rise to those irregularities, do at any event occur due to the change between the filling and the emptying phases, which is a typical situation in regard to batch-wise production of the preforms.

In many situations, in regard to the production of hollow bodies by means of extrusion blow molding, it is expedient and possibly even necessary for the wall thickness or gauge of the preform to be influenced during the material ejection operation, for example in such a way that the regions of the preform which, upon subsequent expansion thereof under the effect of an increased internal pressure, are subjected to a substantial stretching effect, are of greater wall thickness or gauge than those parts of the preform which are only slightly expanded by virtue of the increased internal pressure. In that way it is possible to produce hollow bodies which comply with individual requirements, in particular with a substantially uniform wall thickness. That is achieved by the cross-section of the generally annular outlet opening being enlarged or reduced in an appropriate fashion, for example by means of a movable internal component operatively associated therewith. However those increases and reductions in the dimension of the outlet opening also result in a change in the flow resistance to which the material is subjected and accordingly result in fluctuations in pressure, which can possibly also have a disturbing influence on the formation of the laminate, with the result that the quality of the hollow body produced therefrom is also adversely affected.

Furthermore changes in certain properties of the plasticised material which is frequently formed from a blend of different plastic materials and/or fillers, as well as variations in temperature, may result for example in fluctuations in viscosity which affect the flow properties of the plastic material and thus cause fluctuations in pressure, in particular during the storage chamber-emptying phase. Those fluctuations are generally unforeseeable and unavoidable.

SUMMARY OF THE INVENTION

An object of the present invention is to provide a process for the production of a hollow body from thermoplastic material by extrusion blow molding, which does not seriously suffer from the above-discussed disadvantages.

Another object of the invention is to provide a process for producing hollow bodies from thermoplastic material by extrusion blow molding in such a way that, in spite of the succession of different operating conditions within the extrusion system due to the discontinuous production of the preforms, the resulting preforms and end products to be made therefrom can comply with all requirements in respect of quality which apply in a practical situation.

Still another object of the invention is to provide for the production of preforms for making hollow bodies by extrusion blow molding, such that the resulting preforms are of satisfactory quality, even when changes in the operating condition caused by other influences such as applying a program in respect of the wall thickness of the preform during ejection thereof mean that the flow conditions in the region of the outlet opening of the system, due to a variation in cross-sectional dimensions, are subject to the same alterations.

Still a further object of the present invention is to provide an apparatus for producing hollow bodies by extrusion blow molding, capable of producing preforms for making the hollow bodies which are at least substantially free from irregularities in the preform structure which could have a serious adverse effect on the quality of the product, while being of a simple design configuration.

In accordance with the principles of the present invention those and other objects are attained by a process for the production of hollow bodies from thermoplastic material, the wall of which comprises a laminate structure having at least first and second layers, by means of extrusion blow molding. Preforms comprising a wall having a corresponding number of layers are first produced in a batch-wise manner using an extrusion unit having at least first and second continuously operating extruders and a common extrusion head. The extrusion unit has at least one storage chamber for storage of materials which are plasticised in the extruders, and at least one means for emptying the storage chamber to form a preform, said means being reciprocatingly movable with a stroke-like motion between first and second limit positions by suitable drive means. Flows of material, the number of which corresponds to the number of layers to be provided in the wall structure of the hollow body, are brought together in the extrusion head region in such a way that mutually adjacent flows of material are joined together in at least one laminate-formation region to form a laminate structure for providing the wall of the preform. The process involves at least first and second operating phases, in one of which the at least one storage chamber is filled, with displacement of said material emptying means within the at least one storage chamber, while during the other operating phase the plastic material in the at least one storage chamber is advanced by the at least one material emptying means through a communicating duct within the extrusion head towards the outlet opening thereof. A portion by volume of the laminate is ejected from the outlet opening to form the preform, and a part of the said portion is expanded within the mold cavity of a divided blow molding mold under the effect of an increased internal pressure. The transitions from filling to emptying and from emptying to filling of the at least one storage chamber are produced by opening and closing respectively of the communicating duct between the at least one storage chamber and the outlet opening, while actuation of the at least one chamber emptying means, which is effected by the drive means, is regulated in such a way that, during the transitions from filling to emptying and from emptying to filling, the pressure within the extrusion head is subjected, at least in the at least one laminate-formation region, to no changes which disturb the laminate in such a way as to have an adverse effect on function thereof.

In a second aspect of the invention the foregoing and other objects are achieved by an apparatus for the production of hollow bodies from thermoplastic material having a wall comprising a laminate structure formed by at least first and second layers, by extrusion blow molding, including an extrusion unit comprising at least first and second extruders and a common extrusion head having an annular outlet opening. The extrusion unit further includes at least one storage chamber for storage of the material which is continuously plasticised in the extruders, and at least one means for emptying the at least one storage chamber for forming a preform therefrom, the emptying means being reciprocatable with a stroke-like movement between first and second limit positions. The apparatus further includes at least one divided blow molding mold comprising squeezing-off edges and having at least one mold cavity within which, in operation, at least a part of the central portion of a preform is expanded under an increased internal pressure to provide the respective hollow body, while at both ends of the central portion of the preform a respective end portion of the preform is squeezed off as excess flash material by the squeezing-off edges. The extrusion head defines therewithin at least one laminate-formation region in which the respective flows of material for constituting the individual layers of the laminate wall structure are joined together to form the laminate structure, and a communicating duct connects the laminate-formation region to the outlet opening for the flow of laminate towards the outlet opening. The communicating duct is adapted to be closed by at least one preferably reciprocatingly movable closure means by which the emptying phase or the filling phase respectively is initiated.

In general the procedure involved in the process and apparatus according to the teachings of the present invention is such that the means for emptying the storage chamber, which will normally be in the form of an annular piston, is actuated during the emptying phase by a hydraulic piston cylinder unit, in which respect actuation of the annular piston by the hydraulic unit must necessarily be so selected that the flow resistances involved in the operation of emptying the storage chamber, and the resulting ejection of the preform, are overcome. That results in a corresponding increase in pressure within the extrusion head. In the previous processes as discussed above, after termination of the emptying phase, the actuating unit for operating the annular piston is relieved of the load of the hydraulic operating medium, for example hydraulic oil, so that during the filling phase the annular piston is displaced under the effect of the thermoplastic material flowing into the storage chamber, with a simultaneous corresponding movement of the piston of the hydraulic unit, without the hydraulic unit being subjected to the action of the hydraulic fluid. That mode of operation results in the differences in pressure which have already been discussed above. Admittedly, in that respect it is not only the absolute magnitude of the differences in pressure and thus the extent of the respective variation in pressure that constitute decisive factors, but another important factor is also the time within which that variation in pressure occurs. In that respect it is generally the case that the damaging effect of a variation in pressure to a given extent decreases in proportion to an increasing period of time over which that variation in pressure occurs. In other words, the gradient in respect of the variation in pressure also plays an important part in regard to the effect of that variation in pressure. However, it is normally not possible, or it is possible only to a very limited extent, to reduce or neutralise the effects of a variation in pressure by adopting a particular pressure variation or gradient, as that would always mean that the time allowed for a variation in pressure to a given extent to occur would be increased, with the consequence that, quite apart from other problems, the length of an operating cycle is undesirably increased, such an increase necessarily resulting in a reduction in the level of productivity for the reason that, under normal operating conditions as are required in a mass production situation using an extrusion blow molding process, there is generally not sufficient time to be able to use a gradient in respect of variations in pressure, which would be such as to avoid the occurrence of disturbances and defects in the laminate structure.

It is here that the invention provides a remedy by at least substantially eliminating those difficulties in a simple fashion by virtue of reducing the pressure differences between the emptying phase on the one hand and the filling phase on the other hand, in such a way that such pressure differences are not seriously detrimental to the quality of the preform. As the operating conditions which occur during the emptying phase generally prescribe the pressure required in that phase, that means that the pressure in the filling phase, within the extrusion head, is matched or adapted to that used in the emptying phase. That can be achieved in a simple manner by the drive means for the annular piston for emptying the storage chamber also being subjected to the effect of the hydraulic working medium in a suitable fashion during the filling phase, so that filling of the storage chamber and the resulting displacement of the annular piston into the starting position for the respective next following emptying phase takes place against a suitably set pressure in respect of the hydraulic working medium, by which the annular piston is operated during the emptying phase. In other words, the pressure required during the emptying phase is also maintained during the filling phase at any event to such an extent that the laminate does not suffer from disturbances thereof such as to have a seriously adverse effect in terms of function thereof. In that connection it will generally be preferable for the process to be carried out in such a way that the pressure is also maintained substantially constant during the transitions from emptying to filling and from filling to emptying.

In addition it will normally be desirable for the procedure to be such that the pressure also does not experience any changes which could cause the laminate to be disturbed in such a way as to be detrimental to the function thereof, in the at least one laminate-formation region, during the operating phase in which the at least one storage chamber is being filled. In that connection also it will normally be preferable for the pressure to be kept substantially constant although that will not be necessary or possible in all cases as in the filling phase, under some circumstances, there is a certain time reserve or leeway which makes it possible for a change in pressure to occur, the gradient of which is so selected as to avoid it having harmful effects on the laminate structure.

In accordance with a further feature of the invention the process may provide that the pressure also does not experience any changes which could have the effect of disturbing the laminate structure in such a way as to be detrimental to the function thereof, in the at least one laminate-formation region, during the operating phase in which the at least one storage chamber is being emptied. In this case also it is preferable if possible for the pressure to be kept substantially constant.

Furthermore, it is possible in all cases to operate in such a way that at least during a part of the working cycle and possibly also throughout the entire working cycle, in order to produce the necessary pressure in the plastic material, actuation, which is effected by the above-mentioned drive means, of the at least one means for emptying the at least one storage chamber may be regulated in dependence on the pressure within the extrusion head. Such an operating procedure would also take account of the influences which are to be attributed to the fact that in many situations the cross-sectional dimensions of the outlet opening are varied in accordance with a given program during the emptying phase, in order thereby to influence the thickness of the preform. That results in corresponding changes in the flow conditions in the region of the outlet opening, in such a way that the flow resistance increases with a decreasing size of outlet opening and conversely the flow resistance decreases with an increasing size of outlet opening.

If the speed of the emptying means in the form of an annular piston, for emptying the at least one storage chamber, remained constant, that would result in variations in the pressure within the extrusion head, corresponding to the variations in the size of the generally annular outlet opening, in such a way that the pressure rises with a decreasing width of outlet opening, and vice-versa. In that case the effects of such variations in pressure on the laminate structure depend not only on the extent of the variation in the width of the outlet opening and therewith the resulting variation in pressure, but also the period of timeover which that variation takes place. As those two parameters are laid down by the program in accordance with which the thickness of the wall of the preform is influenced, it is not possible to provide for adaptation of those parameters in such a way as to reduce the effects of the variation in pressure on the quality of the laminate structure, or such adaptation is possible only to a very limited extent.

Another possible way of preventing the laminate structure being adversely affected in terms of its quality by the variations of the flow conditions within the extrusion head, resulting from the effect of the program for controlling the wall thickness of the preform, provides that actuation, by the drive means, of the at least one means for emptying the storage chamber is varied in order to control the speed of the emptying means in dependence on that program during the operating phase in which the storage chamber is being emptied, in such a way that the resulting pressure in the at least one laminate-formation region is not subjected to any changes which could cause disturbance in the laminate structure in such a way as to have an adverse effect on the function thereof. In this case also, it is desirable for the pressure to be kept substantially constant.

In the mode of operation of the process of the invention, as first described above, in which actuation of the means for emptying the storage chamber, for example an annular piston, is regulated in dependence on the pressure in the region of the laminate-formation area within the extrusion head, variations in the width of the outlet opening necessarily cause variations in the speed at which the annular piston moves. That speed is dependent inter alia on the flow resistances of the outlet opening and the properties of the material involved, for example its viscosity. If the size of the outlet opening is increased, the flow resistances decrease and, with the pressure which acts on the plastic material being maintained, the speed of the annular piston will increase. Likewise a reduction in viscosity as may occur for example at higher operating temperatures can result in an increase in speed. A reduction in the size of the outlet opening with the pressure remaining the same and/or an increase in viscosity cause a reduction in the speed of movement of the annular piston for emptying the at least one storage chamber.

In contrast thereto, in the second procedure described above, the speed of the annular piston for emptying the at least one storage chamber is controlled in dependence on the size of the outlet opening in such a way that, in accordance with the respectively effective outlet opening, the annular piston speed is so set that, while taking account of the flow resistances occurring, there is a uniform level of pressure at the laminate-formation region. In accordance with the desired wall thicknesses and the size of the outlet opening corresponding thereto, the respective speeds to be employed can be determined by means of a computing unit and passed to a programmer which operates in parallel with the program in respect of preform wall thickness and which predetermines the required speed of the annular piston.

Admittedly that mode of operation will not result in the pressure being made almost completely uniform, which can be achieved if the speed of the annular piston during the emptying phase is determined directly in dependence on the pressure achieved in the extrusion head. However, as already mentioned, when carrying the principles of the present invention into effect, what is important is not so much ensuring that the pressure is kept absolutely constant, as avoiding fluctuations in pressure per unit of time, which result in an unacceptable reduction in the level of quality of the laminate structure of the preform.

In order to achieve a high level of productivity and uniform product quality, it is necessary for the cycle time of the blow molding machine to be kept as constant as possible, in other words, the cycle time is to be equal from one blow molding cycle to another. Accordingly the production of preforms must be matched to the operating rate and procedure of the blow molding machine. However the irregularities in properties, which irregularities are inherent in any plastic material, can also have an effect on the material ejection procedure for forming the preform.

If the means for emptying the at least one storage chamber is actuated during the material ejection phase in dependence on the pressure to be maintained at the laminate-formation region, then for example fluctuations in viscosity result in variations in the material ejection speed and that in turn has a direct influence on the preform ejection time.

That phenomenon is generally undesirable so that in accordance with a further proposal of the invention the pressure acting on the plastic material is varied in such a way as to maintain a predetermined material ejection time. If for example the ejection time is reduced as the viscosity of the plastic material decreases as a result of an increase in the temperature of the plastic material, then the pressure which is reached in the plastic material is reduced in such a way that the material ejection speed is restored to the speed which provides the desired material ejection time. In that respect the procedure is desirably such that, in order to produce the desired material ejection time, actuation of the at least one means for emptying the storage chamber is varied in order to vary the pressure during the operating phase in which the at least one storage chamber is being filled. That variation in pressure is to be such that as far as possible it takes up the entire period of time during which the storage chamber is being filled. That results in only slight pressure gradients which generally do not result in the laminate structure being undesirably disturbed. If the variation in pressure required is greater than that which can be achieved during one filling phase at an acceptable pressure gradient, it is then desirable for the variation in pressure to be distributed over a plurality of filling phases in order to avoid an excessively high pressure gradient.

In accordance with another preferred feature of the invention, closure of the communication between the at least one storage chamber and the outlet opening is effected in dependence on the volume of the ejected laminate structure, as measured at a predetermined point in the travel or operating movement of the at least one means for emptying the at least one storage chamber. It is however also possible for closure of that communication to be effected in dependence on time or in dependence on the ejected length of the preform, as is detected for example by a light barrier means.

In accordance with another feature of the invention, opening of the communication between the at least one storage chamber and the outlet opening may be effected in dependence on a predetermined travel or operating movement of the at least one means for emptying the at least one storage chamber, that travel or operating movement corresponding to the filled condition of the at least one storage chamber. Other possible forms of procedure in this respect provide that opening of the communication is effected in dependence on time or in dependence on the operating procedure of the associated blow molding machine.

The procedure involved in the process according to the present invention will generally be simpler if only slight fluctuations in pressure are to be expected during the storage chamber emptying phase. That may be the case for example when there is no provision for controlling the wall thickness of the preform being produced, or if the process involves controlling the wall thickness of the preform but the arrangement for controlling the wall thickness produces only slight variations in wall thickness and thus in the cross-sectional dimensions of the outlet opening of the apparatus. In that situation it is possible for the means for emptying the at least one storage chamber to be moved at a constant speed during the emptying phase, and for the pressure within the extrusion head, during the filling phase, to be maintained by suitable actuation of the drive means for the at least one means for emptying the at least one storage chamber, in a range which at least approximately corresponds to the pressure range in which the pressures lie during the emptying phase.

It will be appreciated in this respect that a substantial advantage of the present invention is that the use thereof requires only a slight additional expenditure in regard to machinery or operating procedure. In essential terms the invention only involves regulating or controlling the mode of operation of the system in such a way as to achieve the desired effect, using means and components which are already present in the system. That point also applies in regard to the means required for closing and opening the communication between the at least one storage chamber and the outlet opening in dependence on the status of the operating procedure, as just discussed above. Those means may be disposed within the extrusion head and possibly also at the plane of the outlet opening thereof. The crucial consideration is that such means are of such a configuration and arrangement that the laminate structure is only immaterially affected by actuation thereof.

Further objects, features and advantages of the present invention will be apparent from the following description of preferred embodiments.

DESCRIPTION OF PREFERRED EMBODIMENTS

In the accompanying drawings, the same references are used in each of the respective Figures to identify corresponding components and elements of the system.

Figure 4A:
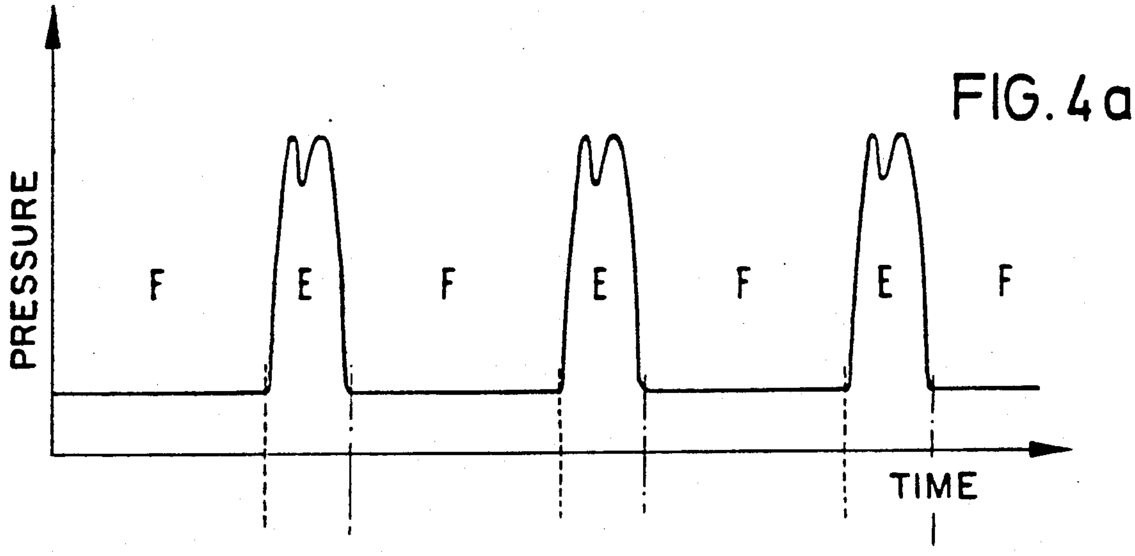
FIG. 4*a* is a graph showing the variation in pressure during different operating phases in accordance with the prior-art procedure.
Figure 4B:
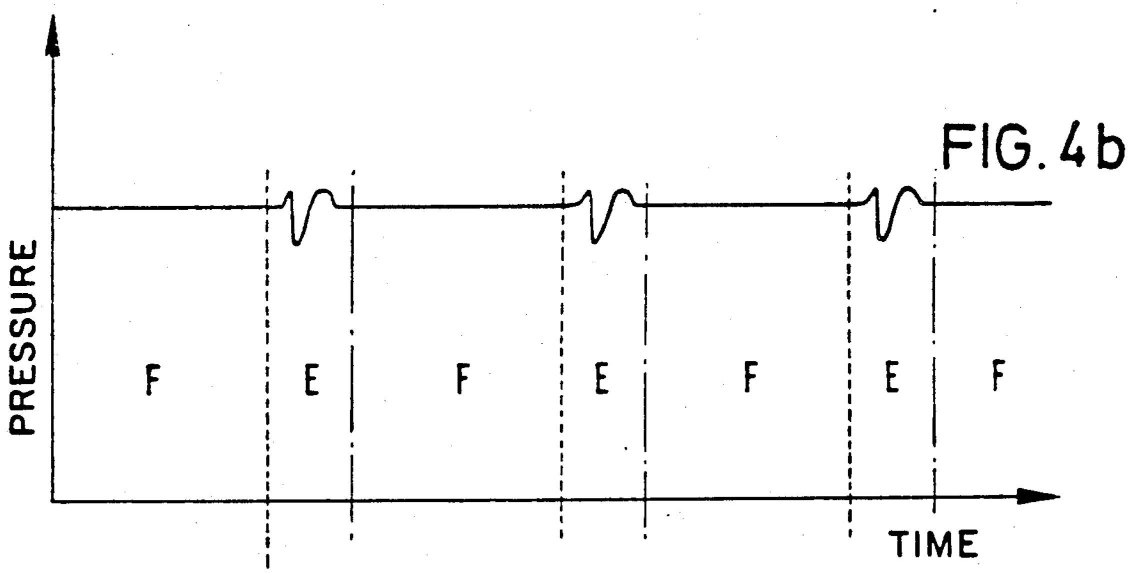
FIG. 4*b* is a graph showing a possible pressure configuration when applying the teaching in accordance with the present invention.

Reference will be made at this point to FIGS. **4*a*–4*c* showing graphs illustrating the respective variations in pressure within an extrusion head of a blow molding apparatus under different conditions over a plurality of operating cycles which are delineated by the vertical dash-dotted lines. Thus, FIG. 4*a*** shows a typical pressure configuration in accordance with a prior-art procedure. In the emptying phases as indicated at E, as denoted by the broken line at the left of each phase E and the dash-dotted line at the right-hand side of each phase E, the pressure is subject to fluctuations due to the effect of an arrangement for controlling the wall thickness of a preform being produced. The most serious variations in pressure occur at the transitions from an emptying phase E to a filling phase F, and from a filling phase F to an emptying phase E.

FIG. **4*b*** shows a pressure configuration which can be achieved when applying the operating procedure in accordance with the principles of this invention. During the filling phase and in particular during transitions between the operating phases, the pressure is now also maintained at a pressure level approximately corresponding to the pressure during the emptying phase, thus eliminating major pressure variations during the above-mentioned transitions, which can result in the laminate structure of the preform being seriously disturbed in such a way as to have an adverse effect on function thereof.

Figure 4C:
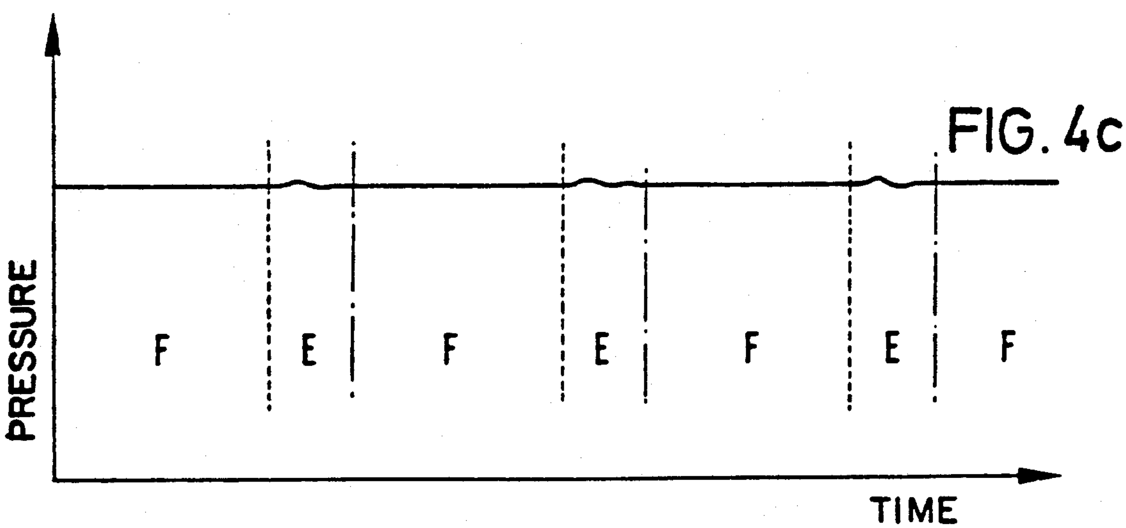
FIG. 4*c*** shows another possible pressure configuration when applying the teaching according to the present invention.

FIG. **4*c* shows an even more favourable pressure configuration which can be achieved when applying the teachings of the present invention. In FIG. 4*c***, during the emptying phase, an annular piston constituting a means for emptying the storage chamber of the apparatus which will be described in greater detail hereinafter is actuated in dependence on the pressure within the extrusion head, in such a way that the fluctuations in pressure which occur during the emptying phase are at least markedly reduced. Such an operating procedure can provide that the pressure remains at least approximately constant over the operating cycles, thereby eliminating fluctuations in pressure which could result in the laminate structure being disturbed.

If the above-mentioned annular piston is actuated in dependence on a predetermined piston speed program which is adapted to the size of the outlet opening of the apparatus, then that arrangement will provide a variation in pressure over the operating cycles, in which the fluctuations are of an extent between those shown in FIGS. **4*b* and 4*c***. That is to be attributed to the fact that such an operating procedure cannot take account of unforeseeable influences such as fluctuations in viscosity of the material used.

Figure 1:
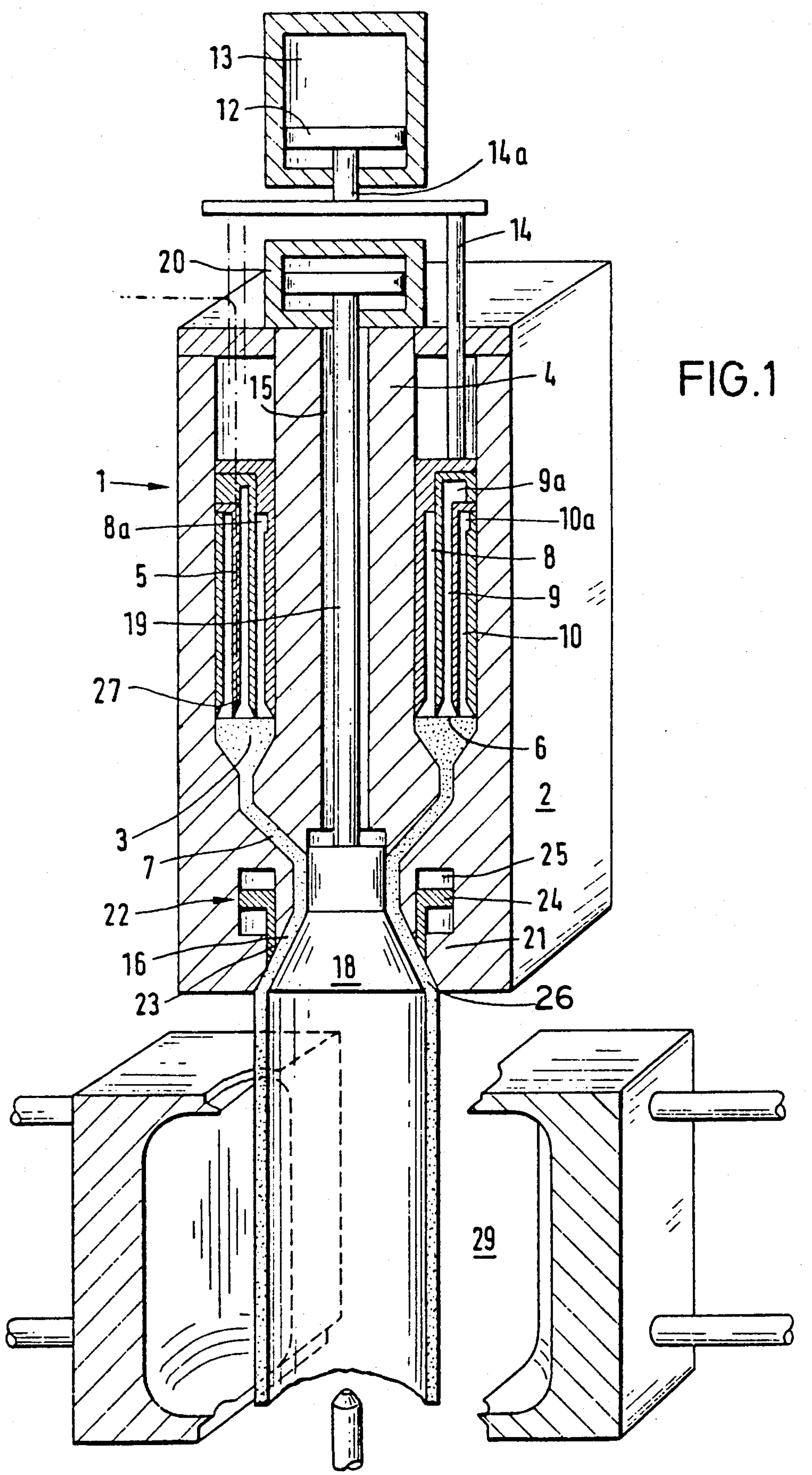
FIG. 1 is a diagrammatic view of an extrusion blow molding head during the phase involving a storage chamber emptying stroke movement of an ejection piston.
Figure 2:
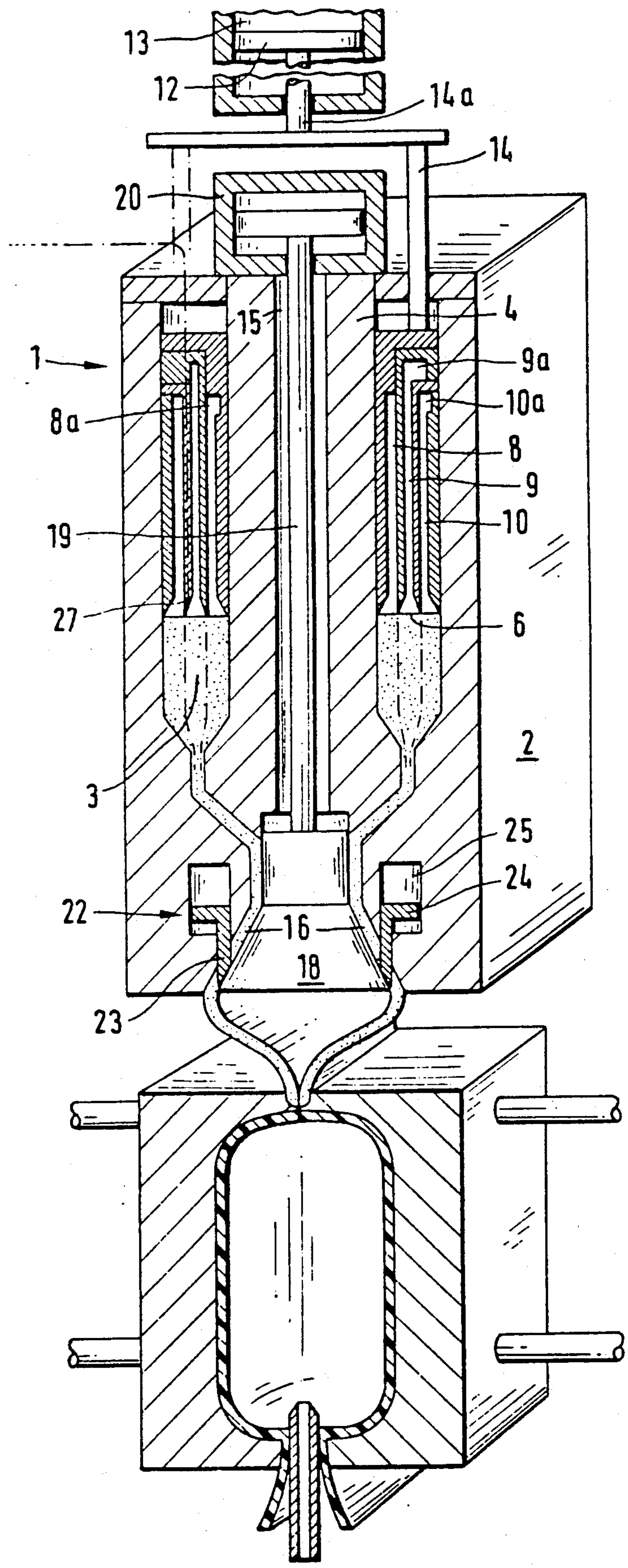
FIG. 2 is a view corresponding to that shown in FIG. 1, but during the filling stroke movement of the ejection piston.

Reference will now be made to FIGS. 1 and 2 of the accompanying drawing, showing an extrusion head indicated generally by reference numeral 1 of an apparatus used in the production of hollow bodies from thermoplastic material by means of extrusion blow molding of a preform. The extrusion head 1 in the illustrated construction has a housing 2 within which a core 4 is arranged in coaxial relationship with the housing 2 and at a spacing from the inside wall surface of the housing 2. The core 4 is provided with an axial bore 15 extending therethrough. The bore 15 serves to accommodate a rod or bar 19 which is capable of reciprocating movement in the bore 15 in the longitudinal direction of the extrusion head 1 and which is guided therein in a suitable fashion. At its one end, which is the lower end in FIG. 1, the rod or bar 19 carries a nozzle core 18 which, jointly with the region 21 of the housing 2 surrounding the nozzle core 18, delimits an outlet opening 16. The rod or bar 19 is connected at its end remote from the outlet opening 16 to the piston of a hydraulic piston cylinder assembly indicated at 20. Suitable actuation of the piston of the unit 20 means that the nozzle core 18 can be moved axially upwardly or downwardly, to vary the width of the annular extrusion or outlet opening 16. That is achieved in the usual manner in that the mutually oppositely disposed surfaces of the nozzle core 18 and the regions 21 of the housing 2 which are disposed therearound and which in particular can be in the form of a separate nozzle ring member, extend in a tapered configuration, as is clearly shown in FIG. 1.

Provided within the extrusion head 1 is at least one storage or accumulator chamber 3 which is disposed coaxially with respect to the core 4 and which is of annular cross-section. Associated with the storage chamber 3 is an axially reciprocatable annular piston 5. At its end remote from the outlet opening 16 the annular piston 5 is connected by way of piston rods 14 and **14*a* to a piston 12 which is guided in a cylinder 13, thus forming a hydraulic piston cylinder assembly. It is also possible for the apparatus to include a plurality of piston cylinder assemblies 12, 13**.

The extrusion head is connected to first, second and third extruders (not shown), each of which conveys a respective thermoplastic material or other material having substantially the same properties in regard to workability, into the extrusion head 1. The extruders are suitably connected to duct systems within the annular piston 5. The communication between the extruders and the extrusion head may be made in any suitable fashion and is therefore not part of the subject-matter of the present invention and accordingly will not therefore be described in greater detail herein. For example the connection between the outlet openings of the respective extruders and the duct systems arranged within the annular piston 5 may be made in the manner described in German laid-open application (DE-OS) No. 36 35 334, while other possible forms of such a connection are described for example in German published application (DE-AS) No. 21 61 356 or German patent specifications Nos. 26 25 786, 26 39 665 and 30 26 822, to which reference is accordingly hereby directed as incorporating the disclosure thereof.

Each of the flows of material from the respective extruders passes within the piston 5 into a respective annular distributor duct 8*a*, 9*a*, 10*a*, each of which extends in a plane normal to the longitudinal axis of the extrusion head. For reasons of space, the distributor ducts 8*a*, 9*a* and 10*a* may be arranged in somewhat displaced relationship relative to each other, within the annular piston 5, in the direction of the longitudinal axis thereof. In the distributor ducts 8*a*, 9*a* and 10*a* the flow of material supplied by the respective extruder in the form of a continuous elongate portion is converted into a flow of material which is of annular cross-section.

Connected to each of the distributor ducts 8*a*, 9*a* and 10*a* is a respective annular duct 8, 9 and 10. The annular ducts 8, 9 and 10 open at the lower end 6 of the annular piston 5 into the storage chamber 3 or, when the annular piston 5 is in its bottom limit position, into the communicating duct 7 which is connected to the storage chamber 3 and which communicates the storage chamber 3 with the annular outlet opening 16 of the extrusion head 1.

The materials which are plasticised by the extruders are passed through the annular ducts 8, 9 and 10 into the storage chamber 3 where they join together to form the laminate structure required. The laminate-formation region or area is thus disposed directly adjoining the free end face 6 of the annular piston 5, which faces towards the outlet opening 16. As the annular piston 5 performs reciprocating movements during a working cycle, the position of the laminate-formation region will depend on the respective position of the annular piston 5.

In addition, provided in the portion of the extrusion head which contains the communicating duct 7 is an annular space or chamber 25 containing an annular piston 24 which is capable of reciprocating movement therein, thereby forming a hydraulic piston cylinder assembly. The piston 24 is connected to a closure element 23 which is also of an annular configuration and which is guided in an annular slot or opening as indicated at 26 which is coaxial with respect to the nozzle core 18. The arrangement in that respect is such that the slot or opening 26 opens into that part of the communicating duct 7 which is delimited by the conically extending portion of the nozzle core 18 and the portion 21 of the housing 2, which is disposed around the nozzle core 18. The closure element 23 is displaced into the communicating duct 17 by a movement of the piston 24 towards the outlet opening 16, until the closure element 23 bears with its edge towards the outlet opening 16 against the nozzle core 18, thereby closing off the communicating duct 7. The communicating duct is opened again by a movement of the piston 24 in the other direction, that is to say upwardly in FIG. 1. Preferably the edge of the closure element 23 which is towards the outlet opening 16 is of such a configuration that, in the position of the closure element 23 in which the communicating duct 7 is open, the edge of the closure element 23 is flush with the surface of the portion 21 of the housing 2, which is disposed around the nozzle core 18. That means that the specified edge of the closure element 23 is of an inclined or tapered configuration, as can be clearly seen from FIG. 1.

When the closure element 23 is moved towards the nozzle core 18 in order to close off the communicating duct 7, it is inevitable that the material present at that time in the communicating duct 7 is squeezed off and thereby disturbed. Desirably therefore the design configuration of the closure element 23 is so selected that it disturbs only a small volume of the material within the communicating duct 7, in other words, the portion of the closure element 23 which is pushed into the communicating duct 7 is desirably to be of the smallest possible structural volume. It will be noted in this respect that, if the construction were to be such that the communicating duct 7 were to be closed off by means of the nozzle core 18, for example by moving the nozzle core to a position of bearing closely and sealingly against the surface of the surrounding portion 21 of the housing 2, that mode of operation would involve substantially more severe disturbance to the laminate structure in that areas as the outside surface of the tapering configuration of the nozzle core 18 and the adjoining inside surface of the portion 21 of the housing 2 are of a generally tapering configuration and an effective closure of the communicating duct 7 could only be achieved in that situation by the mutually oppositely disposed surfaces bearing against each other over at least an appreciable proportion of their areas and in fact over almost the whole of their areas. That would therefore disturb virtually all the laminate structure material disposed in the communicating duct 7 between the nozzle core 18 and the adjoining portion 21 of the housing 2.

In order further to minimise the disturbance caused to the laminate structure in the communicating duct 7, it may be particularly desirable for the mouth opening of the annular slot 26, at which it opens into the communicating duct 7 adjacent the nozzle core, to be disposed in the immediate vicinity of the outlet opening 16 of the extrusion head 1, thereby providing that the region of the laminate structure which suffers disturbance by virtue of closure of the communicating duct 7 is in an end portion by volume of the preform, which portion is in any case excess material and is thus subsequently removed as waste. At any event the arrangement must ensure that the closure element 23, in the closed position thereof, prevents laminate structure from issuing from the outlet opening 16.

During the phase of a working cycle in which the at least one storage chamber 3 is being filled with material, referred to hereinafter as the filling phase, the closure element 23 bears against the surface of the nozzle core 18 in such a way as to close off the communicating duct 7. The material which has been plasticised by the extruders connected to the extrusion head flows through the annular ducts 8, 9 and 10, with the laminate structure being formed at the same time in the storage chamber 3. The annular piston 5 is therefore displaced upwardly, that is to say towards its limit position remote from the outlet opening 16, by the material flowing into the storage chamber 3. As the communicating duct 7 is closed, it is possible for the drive means formed by the hydraulic piston cylinder assembly 12 and 13 for the annular piston 5 to be acted upon by hydraulic pressure during the filling phase in such a way as is required to achieve the desired aim, as referred to hereinbefore.

When the annular piston 5 has reached its upper limit position and consequently the storage chamber 3 is filled with laminate structure material, the communicating duct 7 is opened by displacement of the closure element 23 upwardly from the position shown for example in FIG. 2, whereupon, by virtue of actuation of the drive means 12 and 13 for displacement of the annular piston 5, the laminate structure is moved by the movement of the annular piston 5 out of the outlet opening 16 of the extrusion head 1 into the region of the blow molding mold indicated at 29 in FIG. 1, which is in an open condition to receive the preform which is produced in that way. To terminate the material ejection phase, the closure element 23 is then moved towards the nozzle core 18 by suitable actuation of the piston 24, whereby the communicating duct 7 is closed off. The annular piston 5 which is in its lower limit position at that time is then again moved upwardly by the flows of material continuing to flow into the storage chamber 3. At the same time the blow molding mold 29 is closed and the preform is then expanded therein in per se known manner by an increased internal pressure within the preform.

The extrusion head further includes at least one pressure measuring means diagrammatically indicated at 27 in FIGS. 1 and 2, preferably being arranged in the immediate vicinity of the laminate-formation region. In the extrusion head shown in FIGS. 1 and 2, the pressure measuring means 27 is thus arranged at the end face 6 of the movable annular piston 5 as in that construction the position of the laminate-formation region is dependent on the position of the annular piston 5. If on the other hand the laminate-formation region is disposed at a stationary location within the extrusion head, then it is appropriate for the pressure measuring means to be arranged in the housing 2 of the extrusion head in the vicinity of the laminate-formation region.

Reference will now be made to FIG. *3a* diagrammatically illustrating a first example of a regulating and control arrangement as may be used for carrying out the process according to the present invention. In this embodiment of the system the pressure is kept constant by virtue of actuation of the annular piston 5 for ejecting the material from the storage chamber 3 occurring in dependence on the measured pressure, throughout the entire working cycle, that is to say both the emptying phase and the filling phase in respect of the storage chamber 3. For that purpose the extrusion head includes a pressure measuring means as indicated at *27a* or at an alternative location as indicated at *27b* in FIG. *3a*, the pressure measuring means being so disposed that it is in the immediate vicinity of the laminate-formation region. If the laminate-formation region is at a stationary location in the extrusion head, then the position of the pressure measuring means at *27b* may be appropriate. If however the laminate-formation region is dependent on for example the position of the annular piston 5, as in the case of the construction shown in FIGS. 1 and 2, then it may be appropriate for the pressure measuring means to be disposed at position *27a* on the annular piston 5. At any event the arrangement must be such as to ensure that the pressure can be measured in such a way that the measurement result actually corresponds to the pressure in the laminate-formation region or affords the possibility of deriving the actual pressure in that region, from the measurement result produced by operation of the pressure measuring means. If may therefore also be desirable to provide a plurality of pressure measuring means in the extrusion head.

The pressure measuring means *27a* or *27b* is connected to a pressure regulator 90 which, in dependence on a controllable reference value, produces an adjusting or control parameter at its output, which is transmitted by way of a signal line 91 to a control device 66 which, in dependence on that control parameter, adjusts a valve 67 for controlling the hydraulic working fluid for the piston cylinder unit 12 and 13 in such a way that the desired pressure is set in the extrusion head. The pressure in the hydraulic working fluid which is required for actuation of the annular piston 5 is produced by a pump 68 which fills a pressure storage means 100 of suitable dimensions, by way of a non-return or check valve 101. The pressure storage means 100 communicates with the valve 67 by way of a pressure reducing valve 102 so that the hydraulic working fluid is kept at a sufficiently high and in particular constant pressure level, throughout the entire working cycle.

Actuation of the piston 12 and therewith the annular piston 5, which is produced by the above-described arrangement, provides that the pressure in the laminate-formation region remains substantially constant throughout the entire working cycle. The direction of movement and position of the annular piston 5 are detected by way of a motion or travel pick-up or detector 43 which is operatively connected to a presetting control device 36 for setting the piston travel movement required to eject from the filled storage chamber 3, the amount by volume of laminate structure which is required for a respective preform. Presetting control of the piston travel is therefore required as the volume of the storage chamber 3 is usually so selected as to be greater than the volume of the preform to be ejected therefrom, in order in that way to permit flexible adaptation of the extrusion head to different preforms of different volumes. It will be appreciated that the extrusion head constitutes an expensive item of equipment and it is therefore desirable to arrange the construction thereof in such a way that the same extrusion head can be used with a wide range of preforms of different sizes, to obviate the need for different extrusion heads for different preforms.

When, during a filling operation for the storage chamber 3, the annular piston 5 has reached its upper limit position corresponding to a volume of laminate structure required to form a respective preform, and when the blow molding mold indicated at 29 in FIG. 1 which is associated with the extrusion unit and which is connected by way of a control line indicated at 112 at the right-hand side in FIG. *3a* to a central machine control assembly 41 is ready to receive a premold, the ejection phase is initiated by operation of the central machine control assembly 41.

The hydraulically actuated closure element 23 which closes off the communicating duct 7 in the extrusion head 1 during the storage chamber filling phase is connected by way of a control valve 81 to a pump 82 for the hydraulic working fluid. At the beginning of the material ejection phase, a signal on line 79 from the central machine control assembly 41 causes actuation of a control device 80 to operate the valve 81 to put it into a position such that the closure element 23 is moved upwardly under the effect of the hydraulic fluid supplied to the piston cylinder assembly 24 and 25 thereof, thereby to open the communicating duct 7 so that, as a result of the pressure achieved in the system, the stored laminate structure can be moved downwardly by the movement of the annular piston 5 through the outlet opening 16. The central machine control assembly 41, by way of a signal line 38, supplies the presetting control unit 36 with a signal, in accordance with which the position as from which the set piston stroke movement is to be measured, is established. At the same time, the presetting control unit 36 is operative to activate a timing device 94 which records the duration of the material ejection process.

When, during the ejection process, the annular piston 5 has travelled by a distance which is required to form a preform, the presetting control unit 36 supplies the central machine control assembly 41, by way of the signal line 38, with a signal which causes closure of the closure element 23 in order thereby to terminate the material ejection phase and thus initiate the following storage chamber filling phase. For that purpose, under the control of a signal on the line 79, the control device 80 will operate the valve 81 in such a way that the closure element 23 is displaced into the position of closing the communicating duct 7 in the extrusion head, under the effect of hydraulic working fluid supplied to the piston cylinder assembly 24 and 25 for actuating the closure element 23.

To provide for correction of possible fluctuations in material ejection times, the illustrated construction also includes a control device for influencing the reference value in respect of the pressure to be maintained in the extrusion head, in such a way that, in the event of an excessively long ejection time, the reference pressure for the following material ejection phase is increased during the filling phase, whereas in the event of the ejection time being excessively short, that reference pressure is reduced. More specifically, the correction effect is achieved by virtue of a procedure which provides that the material ejection time as measured by the timing device 94 is compared in a comparison unit 96 to an adjustable reference value in respect of the material ejection time, and the result of the comparison operation is evaluated in a computing unit 92 connected on the output side of the comparison unit 96. On the basis of the magnitude of the deviation between the ejection time reference value and the measured ejection time, and the nature of the deviation, the unit 92 produces a fresh reference value for the pressure regulator 90. It is desirable in that respect for the old or previous reference pressure to be adapted to the fresh reference pressure throughout the entire filling phase in the form of a steady progressive increase or reduction in pressure, in order in that way to avoid abrupt pressure fluctuations. It may also be desirable to effect correction in respect of the material ejection time, only when an acceptable tolerance range is exceeded, in order to produce stable pressure conditions. It will be seen from FIG. 3*a* that the unit 92 is connected to the central machine control assembly 41 as it may be provided that a reference pressure matching procedure as just described above is carried out only during a filling phase.

The illustrated system also includes a wall thickness control device 53 for controlling the wall thickness of the preform produced by the apparatus. The wall thickness control means 53 is brought into operation by the central machine control assembly 41 during a material ejection phase, by means of a suitable signal on the line 42 connecting the assembly 41 to the control device 53, and presets the size of the annular outlet opening 16 in dependence on the distance covered by the annular piston 5. More specifically the arrangement is such that the nozzle core 18 can be moved up and down in the extrusion head 1 by hydraulic actuation of the piston cylinder assembly 20. A control valve 57 communicated with the pump 58 for the hydraulic working fluid is set by the control device 56 in accordance with an output signal 55 from the wall thickness control device 53 in such a way that the core 18 is moved into a position in which the width of the annular outlet opening 16 corresponds to the respective desired width thereof. In that situation the wall thickness control device 53 is connected by way of a line 37 to the presetting control device 36 which ascertains the distance covered by the annular piston 5. To determine the position of the nozzle core 18, the assembly includes a travel motion pickup or detector 50 which is operative to detect the motion of the nozzle core 18 and which co-operates by way of a signal line 51 with the wall thickness control device 53 in a closed control loop.

Figure 3:
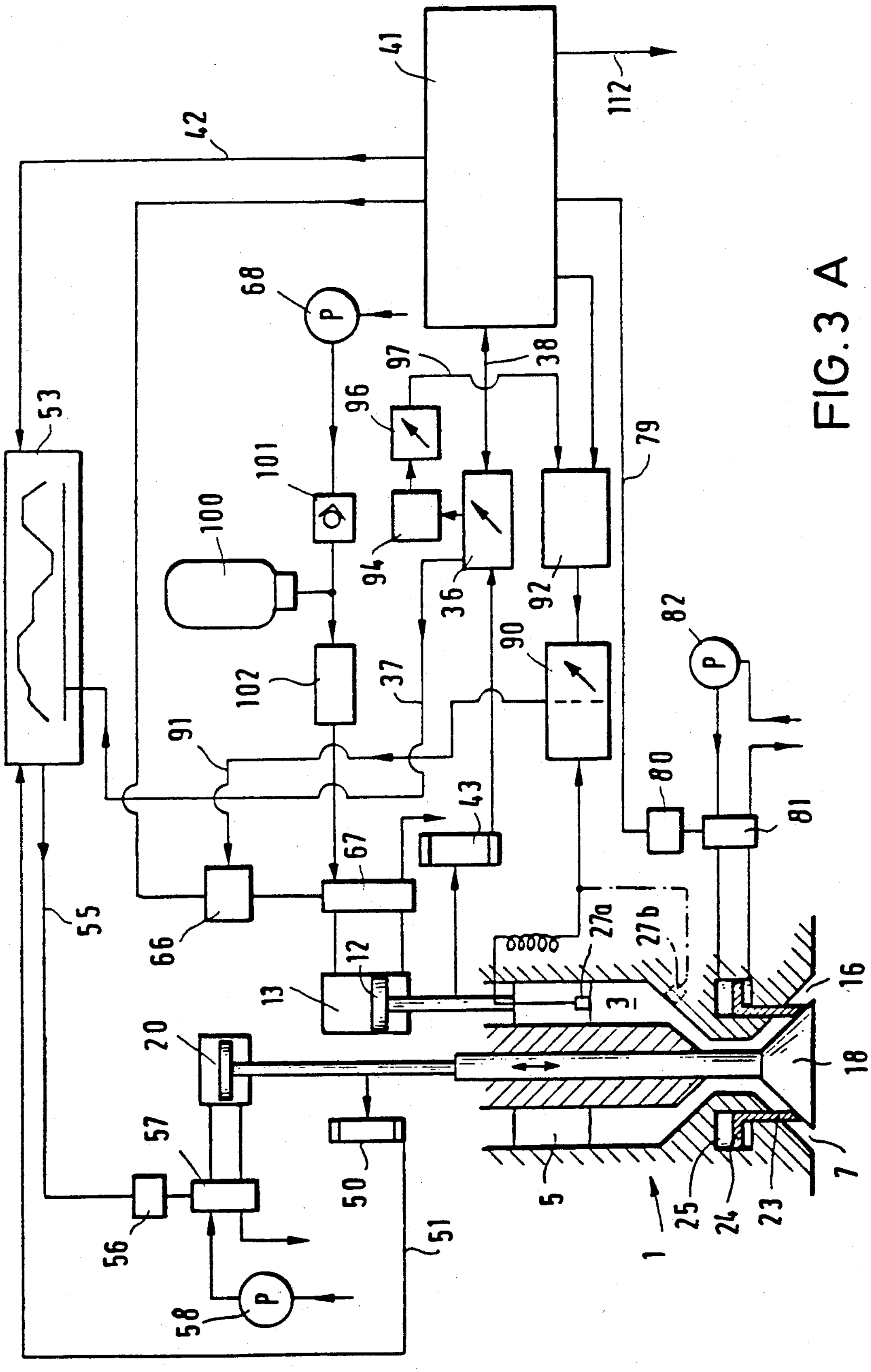
FIG. 3 is a diagrammatic view of an extrusion blow molding apparatus with a preferred regulating arrangement, FIG. **3*b* is a diagrammatic view of an extrusion blow molding apparatus with another form of regulating arrangement.
Figure 3B:
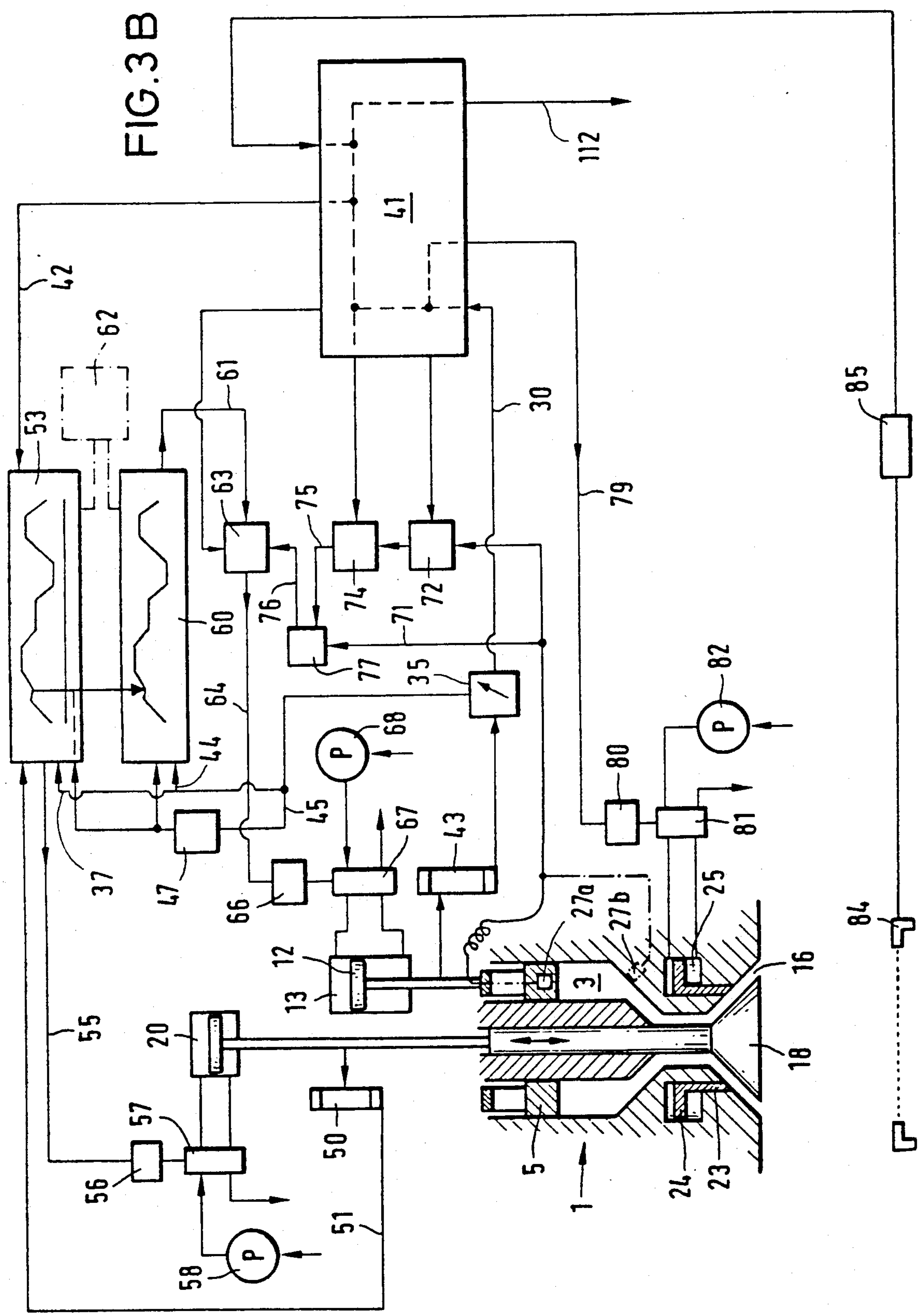

Reference will now be made to FIG. 3*b* showing a further embodiment of a regulating and control arrangement. In a regulating arrangement of this nature, fluctuations in pressure are avoided by a procedure whereby, during a filling phase and during transitions from filling to emptying and from emptying to filling of the storage chamber 3, actuation of the annular piston 5 is regulated in dependence on pressure, whereas during an ejection or storage chamber-emptying phase, the movement of the annular piston 5 is produced in the above-described manner in accordance with a speed programmer 60. For that purpose, the assembly includes a change-over switching device 63, referred to in this description as switching device 63 for the sake of simplicity, which is switched by the central machine control assembly 41 during the storage chamber-emptying or ejection phase in such a way that the speed programmer 60 is connected by way of signal lines 61 and 64 to the control device 66 for the drive unit for the annular piston 5, and produces a control parameter which results in movement of the annular piston 5 in such a fashion that fluctuations in pressure are very substantially avoided. More specifically the arrangement is such that a piston speed is associated in the form of a fixed program with each width or size of outlet opening 16, which is produced by virtue of the preform wall thickness control device 53 which is operative in the material ejection phase. The speed of the piston is so selected or established that an almost equal pressure obtains in connection with a respective size of outlet opening 16, over the entire duration of the storage chamber emptying phase. In that respect it may be desirable for the speed to be calculated in order to be consistent with the respective size of the outlet opening 16 at each time in the ejection phase by means of a microcomputer shown in dash-dotted lines at 62 in FIG. 3*b*. For speed detection purposes, the presetting control unit 36 is connected by way of a branch line 45 to a speed computing device 47 which co-operates with the speed programmer 60 to constitute a regulating circuit. In that way, both an outlet opening size and also an annular piston speed can be operatively associated with each portion of the travel movement of the annular piston 5 by means of the presetting control device 36 which is connected to the preform wall thickness control device 53 by way of line 37 and with the speed programmer 60 by way of line 44, in such a way that on the one hand the apparatus produces a preform with the desired preform wall thickness distribution, while on the other hand the apparatus provides a pressure variation configuration which very substantially avoids fluctuations in pressure. The arrangement can at the least provide a pressure configuration which does not have the effect of disturbing formation of the laminate structure in such a way as to have an adverse effect on function thereof.

During a storage chamber filling phase the annular piston 5 is actuated in dependence on the respective pressure reached. For that purpose the illustrated construction includes a registration unit 72 which, during the ejection phase, is activated by the central machine control assembly 41 to register the pressure measured by the pressure measuring device 27*a* or 27*b*. At the beginning of a storage chamber filling phase, in a computing unit 74 connected to the unit 72, a reference pressure value is communicated by way of a signal line 75 to the pressure regulator 77 connected by way of line 71 to the pressure measuring device 27*a* or 27*b*. That pressure is maintained during the storage chamber filling phase and is in a pressure range corresponding to the range of pressures which occur during a storage chamber emptying phase. The switching device 63 is therefore switched by the machine control assembly 41 in such a way that the pressure regulator 77 co-operates by way of signal lines 76 and 64 with the control device 66 for controlling the hydraulic drive means of the annular piston 5.

In particular this embodiment does not suffer from fluctuations in regard to the working cycle time, although slightly higher pressure fluctuations may occur during the material ejection phase, than when using the control and regulating arrangement shown in FIG. 3*a*.

The above-described embodiments provide that the end of the material ejection phase is signalled by the annular piston 5 having covered a predetermined distance in its travel movement. That is advantageous as it ensures that the same amount of laminate structure is always ejected to produce a respective preform. However it is also possible to provide that the ejection operation is terminated when a respective preform reaches a given length, which is detected for example by a light barrier arrangement as indicated at 84 in FIG. 3*b*. However that operating procedure presupposes that suitable consideration is given to the elongation and return phenomena to which the ejected material is subjected and which must be incorporated into the regulating and control circuit, by using further control devices as indicated at 85 in FIG. 3*b*.

It is also possible to involve other circuitry modes which make it possible to maintain the required pressure, in particular during the storage chamber filling phase and the transitions from filling to emptying and from emptying to filling, without thereby restricting the scope of the invention.

It will also be noted at this point that the volume for forming a respective preform, as described above, is composed of the stored material from the storage chamber and the material which is also extruded by the continuously operating extruders in the course of the material ejection phase. Accordingly the minimum stroke movement of the annular piston 5, which corresponds to a volume of laminate structure required to form a respective preform, is just such that that volume, plus the additionally extruded material, can provide the volume of laminate structure required to produce a respective preform, during the material ejection phase.

Although the constructions described hereinbefore include only a single storage chamber, the teachings of the present invention can also be applied in relation to processes and apparatuses for the production of hollow bodies from thermoplastic material, which involve the use of extrusion heads with two or more storage chambers. Thus for example it is possible to provide a respective storage chamber for each layer of material making up the laminate structure or for each kind of material used, with a respective storage chamber emptying means being operatively associated with each storage chamber.

It will be appreciated that the foregoing processes and apparatuses for the production of hollow bodies from thermoplastic material by extrusion blow molding of a preform have been set forth solely by way of example and illustration of the principles of the present invention and that various modifications and alterations may be made therein without thereby departing from the spirit and scope of the invention.

What is claimed is:

1. A batch process for the production of multi-layer hollow bodies by blow molding of tubular preforms, each preform being extruded in one working cycle through an outlet opening by an extrusion unit including a single extrusion head with the outlet opening and a plurality of extruders coupled with the extrusion head, each preform having a tubular wall of laminate material including at least one layer of each of at least two different thermoplastic materials, said extruders collectively containing all component materials of the laminate material, the unit including at least one laminate formation region, at least one storage chamber in communication with the at least one laminate-formation region and a communicating duct between said at least one storage chamber and the outlet opening, the communicating duct including a closure element, separate flows of component materials coming together in the laminate-formation region to form a laminate of the component materials, the at least one storage chamber being defined by at least one emptying means, the at least one emptying means reciprocating in a filling stroke movement for accumulating material in the at least one storage chamber and in an emptying stroke movement for advancing material from the at least one storage chamber towards the outlet opening during each working cycle, the process comprising the steps of:

- continuously feeding the component materials from the plurality of extruders towards the outlet opening throughout each working cycle;
- blocking the flow of the laminate to the outlet opening from the at least one laminate formation region and the at least one storage chamber by closing off the communication duct using the closure element;
- filling the at least one storage chamber with material, with an accompanying filling movement of the at least one emptying means while closing off the communication duct;
- opening the communication duct to the flow of the laminate through the outlet opening from the at least one laminate formation region and the at least one storage area;

emptying the at least one storage chamber of the material the chamber was filled with during the step of filling with an accompanying emptying stroke movement of the at least one emptying means whereby the emptying results in an accompanying ejection of one of the preforms from the outlet opening;

blow molding the ejected preform to form one of the hollow multi-layer bodies;

again blocking the flow of the laminate to the outlet opening from the at least one laminate formation region and the at least one storage chamber after the ejection of the preform;

again filling the at least one storage chamber with material, with an accompanying filling movement of the at least one emptying means after again blocking the flow of the laminate; and regulating movement of the at least one emptying means during transitions from filling to emptying and from emptying to again filling of the at least one storage chamber to maintain pressure on the material in the least one laminate formation region during the transitions such that pressure changes which disturb the structure of the laminate layers being formed during any of the transitions are sufficiently avoided and the continuity of the laminate layers formed, during any of the transitions, as a wall of one of the hollow bodies is maintained.

2. The process set forth in claim 1 wherein the regulating step comprises maintaining a substantially constant pressure at least in the at least one laminate formation region during the transitions from emptying to filling and from filling to emptying.

3. The process set forth in claim 1 further comprising the step of maintaining pressure in the at least one laminate-formation region during each filling without changes which disturb the laminate being formed during filling sufficiently to adversely effect functioning of the laminate material formed during filling as a wall of one of the hollow bodies.

4. The process set forth in claim 1 further comprising the step of maintaining pressure in the at least one laminate-formation region at least substantially constant during filling.

5. The process set forth in claim 1 further comprising the step of maintaining pressure in said at least one laminate-formation region during emptying without changes which disturb the laminate formed during emptying sufficiently to adversely effect functioning of the laminate material formed during emptying as a wall of one of the hollow bodies.

6. The process set forth in claim 1 further comprising the step of maintaining pressure in the at least one laminate formation region at least substantially constant during emptying.

7. The process set forth in claim 1 further comprising the steps of sensing pressure in material within the extrusion head and controlling movement of the at least one emptying means for at least part of each working cycle in response to the sensed pressure.

8. The process set forth in claim 1 further comprising the step of sensing pressure in material in the extrusion head and wherein said regulating step further comprises regulating movement of the at least one emptying means throughout each working cycle in response to the sensed pressure to maintain pressure within the at least one laminate-formation region substantially constant throughout each working cycle.

9. The process set forth in claim 1 further comprising the steps of varying size of the outlet opening during emptying to control thickness of the preform wall and varying speed of the at least one emptying means during emptying such that pressure in the at least one laminate-formation region is maintained without changes which disturb the laminate being formed during emptying sufficiently to adversely effect functioning of the laminate material formed during emptying as a wall of one of the hollow bodies.

10. The process set forth in claim 1 further comprising the steps of varying size of the outlet opening during emptying to control thickness of the preform wall and varying speed of the at least one emptying means during emptying to maintain a substantially constant pressure in the at least one laminate-formation region throughout the emptying step.

11. The process set forth in claim 1 wherein the extrusion unit is configured to provide an ejecting step of predetermined duration, further comprising the steps of comparing actual sensed ejection times to the predetermined duration and adjusting pressure in the next working cycle to lower pressure in the at least one laminate-formation region when a shorter than predetermined ejection time is sensed and to increase pressure in the at least one laminate-formation region when a longer than predetermined ejection period is sensed, the variations in pressure in the at least one laminate-formation region being carried out without changes sufficiently great to disturb the laminate being formed sufficiently to adversely effect functioning of the laminate being formed as a wall of one of the hollow bodies.

12. The process set forth in claim 11 wherein the step of adjusting pressure is made during a subsequent filling step.

13. The process set forth in claim 1 wherein the step of blocking further comprises blocking the flow of the laminate in response to a predetermined travel of the at least one emptying means.

14. The process set forth in claim 1 wherein the step of blocking further comprises controlling the opening and closing of the communication duct using the closure element in a time-dependant manner.

15. The process set forth in claim 1 wherein the step of closing further comprises blocking the communication duct in response to a detected ejected length of the preform.

16. The process set forth in claim 15 further comprising the step of detecting said ejected length of the preform by a light barrier.

17. The process set forth in claim 1 wherein the step of opening further comprises opening the communication duct in response to a predetermined travel of the at least one emptying means.

18. The process set forth in claim 1 wherein the step of opening further comprises opening the communication duct in a time-dependent manner.

19. The process set forth in claim 18 wherein the step of opening further comprises opening the communication duct in response to a state of a blow molding apparatus associated with the unit and wherein the process further comprises receiving the ejected preform in the associated blow molding apparatus and forming one of the hollow bodies.

20. The process set forth in claim 1 wherein the regulating step further comprises the steps of:

moving the at least one emptying means at a constant speed during emptying;

and moving the at least one emptying means during filling so as to hold pressure within the at least one laminate-formation region within a range of the pressure generated in the at least one laminate-formation region during emptying when the at least one emptying means is moved at the constant speed.

* * * * *